United States Patent [19]
Yoshida

[11] Patent Number: 4,975,898
[45] Date of Patent: Dec. 4, 1990

[54] METHOD AND APPARATUS FOR PREVENTING COPYING OF AN OPTICAL DISK

[75] Inventor: Tadao Yoshida, Kanagawa, Japan

[73] Assignee: Sony Corporation, Tokyo, Japan

[21] Appl. No.: 243,035

[22] PCT Filed: Dec. 21, 1987

[86] PCT No.: PCT/JP87/01005

§ 371 Date: Aug. 18, 1988

§ 102(e) Date: Aug. 18, 1988

[87] PCT Pub. No.: WO88/05203

PCT Pub. Date: Jul. 14, 1988

[30] Foreign Application Priority Data

Dec. 27, 1986 [JP] Japan .................................. 61-315061

[51] Int. Cl.$^5$ .............................................. G11B 7/00
[52] U.S. Cl. ...................................... 369/100; 369/48; 360/60
[58] Field of Search .................... 360/60; 369/100, 32, 369/48, 49, 50, 59, 13, 14, 15; 364/286.5, 286.6; 380/4

[56] References Cited

U.S. PATENT DOCUMENTS

| | | | |
|---|---|---|---|
| 4,462,078 | 7/1984 | Ross | 360/60 |
| 4,577,289 | 3/1986 | Comerford et al. | 360/60 |
| 4,584,641 | 4/1986 | Guglielmino | 360/60 |
| 4,785,361 | 11/1988 | Brotby | 360/60 |
| 4,823,210 | 4/1989 | Bond | 360/60 |
| 4,858,036 | 8/1989 | Ginkel | 360/60 |
| 4,858,218 | 8/1989 | Takagi et al. | 369/15 |
| 4,879,704 | 11/1989 | Takagi et al. | 369/14 |

FOREIGN PATENT DOCUMENTS

| | | | |
|---|---|---|---|
| 0129427 | 12/1984 | European Pat. Off. | 360/60 |
| 2131580 | 6/1989 | United Kingdom | 360/60 |

OTHER PUBLICATIONS

Voelcker et al., "How Disks are 'Padlocked'", IEEE Spectrum, vol. 23, No. 6, Jun. 1986, pp. 32–40.
Guruge, IBM Tech. Disc. Bul., vol. 21, No. 2, Jul. 1978, pp. 836–837.

Primary Examiner—Donald McElheny, Jr.
Attorney, Agent, or Firm—Philip M. Shaw, Jr.

[57] ABSTRACT

A method and apparatus for preventing copying of an optical disk. A software program and the basic data necessary for executing the program, as well as an erasing program are nonrewritably recorded in advance on a predetermined region of the disk. The erasing program attempts to erase the non-rewritable portion, which has no effect on the original disk, but will erase that portion of a disk which is copied. Thus, if the software program and the basic data for executing the program are copied without authorization, the copy disk is prevented from being used.

8 Claims, 2 Drawing Sheets

METHOD AND APPARATUS FOR PREVENTING COPYING OF AN OPTICAL DISK

TECHNICAL FIELD

This invention relates to an optical disk capable of optically recording and reproducing data, and an optical disk device adapted to record and reproduce data using the optical disk as the recording medium.

BACKGROUND ART

Programs for performing desired data processing, including basic programs, such as, above all, operating systems (OS), various programming languages, simplified program languages or word processeors, or the basic data indispensable for these programs, such as dictionary data, pattern data for Chinese characters or parameter data for pattern recognition, although not in need of being rewritten in a manner distinct from a variety of general data that are to be processed, occasionally require some form of write inhibit processing, in order to prevent inadvertent rewriting of the contents by mistaken operation. To this end, in a magnetic disk, such as a so-called floppy disk, the basic program or the basic data are protected by specifying the possible presence of write inhibition for each file by a software technique. However, the write protection implemented by the software technique may be cancelled rather easily by the software such that writing on a file specified for write inhibition may occasionally occur during, for example, program runaway or upon the occurrence of software errors. Therefore, for more reliable protection, a disk having the program and the basic data recorded thereon is provided as a so-called program disk separately from the data disk and a write inhibit measure such as a mechanical or hardware technique employing a so-called protect seal or protect notch is frequently applied to the program disk in its entirety.

It is noted that, as disclosed, for example, in the Japanese Pat. Publication KOKAI No. 100249/1983, there has been proposed an optical information recording carrier which is provided with signal tracks composed of pits dedicated to reproduction for facilitating adjustment of the recording/reproducing optical system.

Recently, a recording medium having an extremely high recording density, such as an opto-magnetic disk, has made its debut. With an optical disk having ultra-high recording density, it is not an effective utilization of the disk's recording capacity to prepare a disk dedicated to a program file to inhibit writing thereon. The basic program such as the aforementioned OS is formed by tens to hundreds of kilobytes, whereas the basic data is usually formed of hundreds of kilobytes, so that, even when several basic programs and data are recorded in combination, a recording capacity on the order of several megabytes suffices. However, an optical disk usually has a recording capacity amounting to several hundreds of megabytes, which is larger by approximately a hundred times than that required for the basic data or program. Therefore, when an optical disk is non-rewritably set as a so-called program disk, recording uses only a small portion of the recording capacity, while the remaining major portion is not used for recording, which is not economical. Therefore, one must resort to designating the write inhibit for each file for protection against mistaken writing by a software technique, which has a drawback in that it has an insufficient protection capability against software errors, as mentioned above.

On the other hand, various other copy inhibit measures are used to prevent duplication without authorization. However, the risk remain extremely high that the program disk will be duplicated and illicitly used by other than the authorized users with the aid of a copy program.

The present invention has been made with the above in mind and is intended to provide an optical disk wherein an erasure program for the record regions of the disk is nonrewritably recorded on a writable optical disk, along with the software program or basic data, to realize powerful write protection for the software program or the basic data, while inhibiting the duplication of the disk without authorization.

DISCLOSURE OF THE INVENTION

To accomplish the above object, the present invention provides an optical disk allowing data recording and reproduction, an erasure program for executing an erasure of record regions of the disk which is previously recorded non-rewritably at a prescribed region on the disk, and a software program adapted for handling data recorded on the disk or the basic data required for executing the program. According to the present invention, an erasure program for executing the erasure of the non-rewritable recording regions of the optical disk is previously non-rewritably recorded on the same non-rewritable region on the disk, along with a file the rewriting of which is not required or desired to be inhibited, such as the software program or the basic data, so that a powerful and reliable write protection as compared with simple protection by software may be implemented. When the record contents of the optical disk are duplicated and the copy disk is used, the software program and the basic data are erased by the erasure program so that an illicit or unauthorized use of the copy disk is prohibited.

BEST MODE OF PRACTICING THE INVENTION

Figure 2:
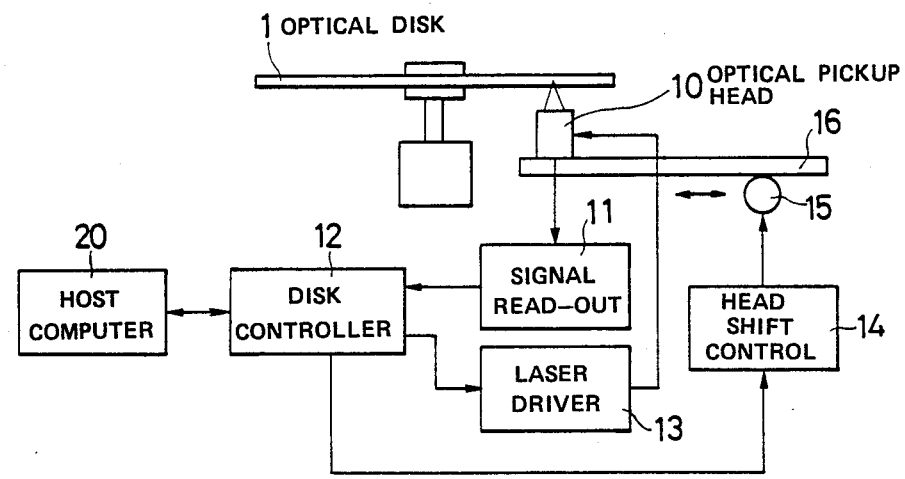
FIG. 2 is a block diagram showing the construction of an optical disk device adapted for recording/reproducing data using the optical disk as the recording medium.
Figure 3:
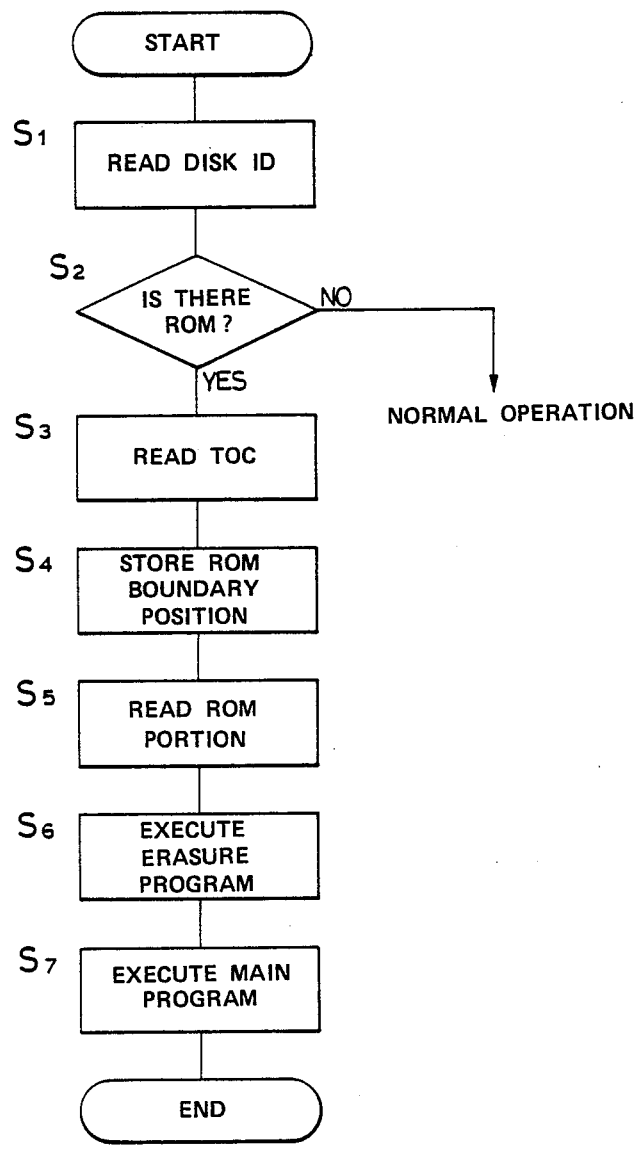
FIG. 3 is a flow chart for illustration of the operation of the optical disk device.

By referring to FIGS. 1 to 3, certain embodiments of the optical disk and the optical disk device of the present invention will be explained.

Figure 1:
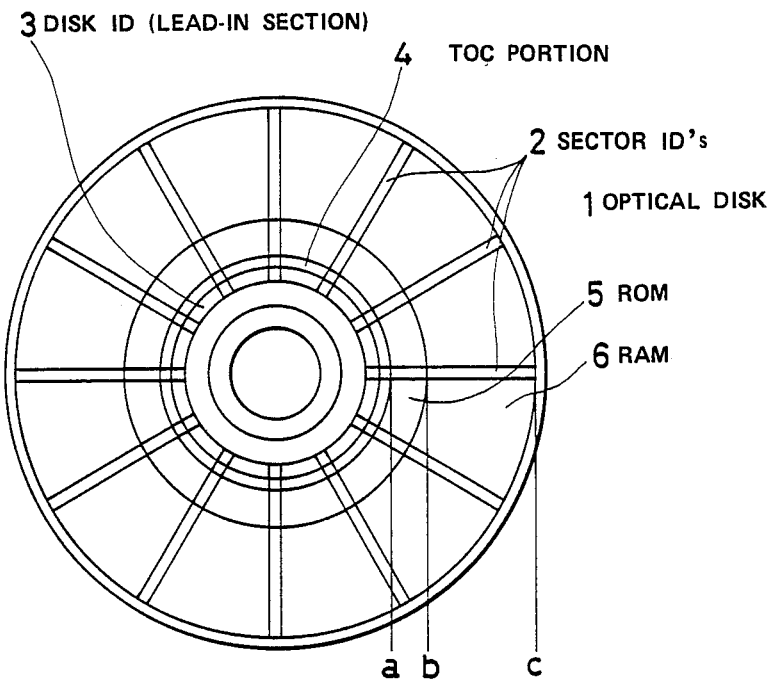
FIG. 1 is a plan view of an optical disk according to the present invention.

Referring to FIG. 1, the optical disk 1 is capable of opto-magnetically recording and/or reproducing signals. Concentrically or spirally extending tracks are divided into prescribed lengths or prescribed angles for defining a plurality of sectors. An ID portion 2 in which ID codes including track or sector addresses are recorded, is prerecorded and formed (pre-formatted) as by so-called embossing at the leading position of each of these sectors. In a region of the innermost track of the optical disk 1, a so-called lead-in portion or a disk ID 3 is recorded. Adjacent to the disk ID towards the outer periphery is a socalled TOC (table of contents) portion 4 in which index information concerning the disk record contents is recorded. The region between an outer peripheral position a of the TOC portion 4 and a position b separated from the position a towards the outer periphery a predetermined distance is a non-rewritable read-only memory or ROM 5. The remaining region, the outermost peripheral position c of the disk, is a rewritable RAM 6 adapted for realizing the functions proper to the opto-magnetic recording type disk 1.

The ROM 5 is so designed that signals cannot be written physically therein by an optical pickup head of the user's disk device. For example, the signal recording system adopted in the ROM 5 is such that, similarly to the preformated ID 2 in each sector, signals are recorded as physical changes in shape by forming pits or holes on the recording surface by a so-called embossing operation. However, while the address data etc. of the sector IDs 2 is the data used in the optical disk device, such as a disk controller, the contents recorded in the ROM 5 are programs or data exchanged with e.g. a host computer outside the disk device and an erasure program for executing the erasure operation of the recording regions. Thus, in the ROM 5, there is previously recorded and formed by the disk suppliers an erasure program adapted for designating and erasing the recording regions in the ROM 5, in addition to a basic software program, such as the aforementioned OS, programming languages, simplified program languages or word processor softwares, and data such as dictionary data or patterns of Chinese characters, that are indispensable to these programs. It is noted that information indicating whether the optical disk is of the type having the aforementioned ROM 5 is written in the disk ID 3, such that, when the disk system is put into position for use by the user or initialized by a resetting operation, the optical pickup head first reads the disk ID 3 to determine if the optical disk is provided with the ROM 5. In the TOC portion 4, the inner peripheral foundary position a and the outer peripheral boundary position b are recorded.

The diagrammatic construction and operation of the essential portion of the system which is adapted for recording and/or reproducing the optical disk on which the boundary positional information of the region of the ROM 5 is recorded, will be explained by referring to FIGS. 2 and 3.

On starting the use of the optical disk 1, the optical pickup head 10 scans the disk ID 3 of the disk 1 as described hereinabove to reproduce the record contents by a signal reading circuit 11. Depending on the reproduced disk ID information, the disk controller 12 determines whether the optical disk 1 now in use is or is not of the type having the ROM 5 (steps $S_1$ and $S_2$ in FIG. 3). When the result is NO (that is, when the disk is not provided with the ROM) the customary disk control operation is performed. Conversely, when the result is YES, the TOC portion 4 of the optical disk 1 is read to determine the inner and outer peripheral boundary positions of the ROM 5 to store the boundary position information in a memory (steps $S_3$ and $S_4$ in FIG. 3). The contents of the ROM 5 are then read and the disk controller 12 executes automatically the erasure operation of the ROM by the erasure program afforded as the record contents of the ROM 5, after which the host computer 20 executes the main program, such as word processing, stored as the record contents of the ROM 5 (steps $S_5$, $S_6$ and $S_7$).

It is noted that the optical disk device is designed so as to exchange data or control signals with exterior devices, such as the host computer 20, through the disk controller 12, while the signals from the optical pickup head 10 are transmitted to the disk controller 12 through a signal readout circuit 11. Responsive to control commands from the host computer 20, the disk controller 12 controls a laser driver 13 and a head shift control circuit 14 to perform control operations in the read, write and erase modes by the optical pickup head 10. The head shift control circuit 14 also operates to drive the head shift motor 15 into rotation to control the shifting of the optical pickup head 10 radially on the disk by way of a head supporting plate 16.

In the present embodiment, when an erasure operation is automatically executed on the non-rewritable ROM 5 of the optical disk 1, the record contents of the ROM 5 cannot be rewritten or erased, while any adverse effects by the mistaken operation, such as destruction of the program or basic data can be completely prevented so that the powerful write protection of the data in the ROM 5 is realized. Since the ROM 5 and the RAM 6 exist together in one disk, 1 a program disk and a data disk may be combined into one disk to provide an optical disk convenient in practical application. When the record contents of the optical disk 1 are copied to another rewritable optical disk such as an opto-magnetic disk to produce a duplicated disk, the erasure program is executed at the step $S_6$ for automatically erasing the contents of the copied ROM portions so that use of a disk copied without authorization is prohibited.

What is claimed is:

1. An optical disk for recording and reproducing data which contains a computer software application program, for use in an optical disk recording and reproducing apparatus, comprising:

a read-only non-erasable portion which contains said computer software application program;

a read and write erasable portion in which data can be recorded;

an erasure program contained in said read-only non-erasable portion which is run when said disk is first read and which instructs said recording and reproducing apparatus to erase any erasable information located in the portion of said disk occupied by said read-only non-erasable portion, such that if said disk is copied onto a read and write erasable disk said computer software application program will be erased upon use of the copied disk.

2. An optical disk according to claim 1 wherein said computer software application program and said erasure program are recorded in said read-only non-erasable portion as physical shape changes on the surface of said portion.

3. An optical disk according to claim 1 wherein said read-only non-erasable portion comprises the inner periphery of said disk.

4. An optical disk according to claim 3 further comprising an index of the contents of said disk which is located inwardly of the inner periphery of said disk.

5. A method of preventing a computer software application program recorded on an optical disk for use in an optical disk reader having a disk controller from being copied, comprising:

recording said computer software application program on a read-only non-erasable portion located on said disk;

recording an erasure program in said read-only non-erasable portion which instructs said recording and reproducing apparatus to erase any erasable information located in the portion of said disk occupied by said read-only non-erasable portion;

instructing said disk controller to run said erasure program when said disk is first read, such that if said disk is copied onto a read and write erasable disk said computer software application program will be erased upon use of the copied disk.

6. A method according to claim 5 wherein said computer software application program and said erasure program are recorded in said read-only non-erasable portion as physical shape changes on the surface of said portion.

7. A method according to claim 5 further comprising locating said read-only non-erasable portion at the inner periphery of said disk.

8. A method according to claim 7 further comprising providing an index of the contents of said disk which is located inwardly of the inner periphery of said disk.

* * * * *